March 22, 1966 K. EULER 3,242,479
CONVERTING MESSAGE AMPLITUDE VALUES INTO A PULSE SEQUENCE
CORRESPONDING TO A BINARY PERMUTATION CODE
Filed Feb. 19, 1962 2 Sheets-Sheet 1

March 22, 1966 K. EULER 3,242,479

CONVERTING MESSAGE AMPLITUDE VALUES INTO A PULSE SEQUENCE CORRESPONDING TO A BINARY PERMUTATION CODE

Filed Feb. 19, 1962 2 Sheets-Sheet 2

United States Patent Office 3,242,479

Patented Mar. 22, 1966

3,242,479
CONVERTING MESSAGE AMPLITUDE VALUES INTO A PULSE SEQUENCE CORRESPONDING TO A BINARY PERMUTATION CODE

Karl Euler, Munich, Germany, assignor to Siemens & Halske Aktiengesellschaft Berlin and Munich, Germany, a corporation of Germany Filed Feb. 19, 1962, Ser. No. 174,201
Claims priority, application Germany, Feb. 28, 1961, S 72,754
9 Claims. (Cl. 340—347)

The invention disclosed herein is concerned with a circuit arrangement for converting amplitude values (analog values) of a message into a pulse sequence corresponding to a binary permutation code.

The transmission of an information over a line or over a wireless channel is usually effected by amplitude modulation or frequency modulation of a high frequency carrier oscillation, with an electrical value, for example, a voltage or a current, the amplitude course of which corresponds to the information which is to be transmitted. The voltage or the current, and therewith the information, is obtained by demodulation from the modulated carrier oscillation at the end of the transmission channel.

It is for the undistorted transmission important that the transmitted frequency band contains also the side bands produced by the modulation. Not only the side bands lying close to the carrier, but further side bands are transmitted by means of frequency modulation, for reasons of a good signal/noise voltage response, thus requiring a broader frequency band than would be required in the case of transmission involving amplitude modulation. However, amplitude modulation has the drawback that the energy which is available for the transmission depends upon the modulation amplitude and is therefore not constant as to time. The ratio, signal voltage/noise voltage, therefore is, assuming the same peak efficiency, worse in the case of amplitude modulation than in the case of frequency modulation. In order to obtain a more favorable ratio of signal voltage to the noise voltage, such a modulation of impulses of a high frequency carrier oscillation was used in place of a continuous amplitude modulation or a continuous frequency modulation. However, no basic change of conditions is thereby obtained.

The advantage of a favorable ratio of signal voltage and noise voltage, jointly with low requirements as to uniform transmission of the side bands may however be achieved by periodically extracting from the electrical value which corresponds to the information, a sample of the amplitude which happens to be present at that instant, and by separately transmitting these amplitude samples by means of coded signals. This kind of modulation is referred to as pulse code modulation (PCM).

There are in the pulse code modulation several possibilities with respect to the construction and allocation of the individual signals to the individual amplitude values. The possibility which is considered as being especially favorable involves the binary code which is constructed in accordance with the digital calculating rules, because the recovery of the value corresponding to the information, from the code signals, is rendered particularly simple at the receiving side. The procedure which is thereby followed proposes to provide for the amplitude course $2^n$ amplitude stages, for example, 16 different amplitude stages and to assign to each of these amplitude stages a given code signal. These signals are constructed in accordance with the known calculating rules of the digital system ($0+0=0$; $0+1=1$; $1+0=1$; $1+1=0$ with carry over $U=1$) that is, for example, amplitude value 0=0000; amplitude value 1=0001; amplitude value 2=0010; amplitude value 3=0011, etc.

The conversion of analog values into such code signals, or into code signals constructed according to other formation rules, is usually effected by special coding tubes, that is, tubes wherein an electron beam is, similarly as in a television tube, guided over a screen, using, however, an intermediate mask which is perpendicularly to the line direction subdivided according to the number of amplitude stages and which has in the individual lines apertures corresponding to the code signals. However, in order to avoid ambiguities in such coding tubes, it is necessary to use a code deviating from the previously explained binary code, namely, the so-called Stibitz-Gray code. From this code can be obtained, by conversion, the binary code.

In accordance with a prior proposal, a circuit comprising flip resistors is used in place of these coding tubes, which have as a rule only a short useful life, whereby signals are for example obtained according to the Stibitz-Gray code, based upon the different amplitude values, which signals are converted in the circuit into the previously mentioned binary code signals which serve for the transmission.

The previous proposal is particularly concerned with a circuit arrangement for converting analog values into an impulse sequence corresponding to a binary permutation code with a series circuit of current-dependent resistors with flip properties which are traversed by a current (analog current) corresponding to the analog value which is to be converted, whereby the individual flip (or triggering) resistors flip at different values of the analog current from a condition of low resistance into a condition of higher resistance and vice versa, with the important feature that two parallel series circuits of flip resistors are provided for each place of the binary permutation code, and that the flipping or triggering points thereof are staged in such a manner that the resistors flip responsive to continuously changing analog current alternately in the one and in the other series circuit, and that the output signal which corresponds to the allocated place of the binary permutation code is produced by difference formation between the voltages at the two series circuits.

The object of the present invention is to develop this previous proposal so that signals are obtained directly from the analog values which signals correspond to a binary code constructed in accordance with desired formation rules. This procedure results in considerable reduction of expenditures.

Proceeding from a circuit arrangement for the conversion of amplitude values (analog values) of a message into an impulse sequence which corresponds to a binary permutation code, employing a series circuit of resistors with flip properties, the resistance values of which depend upon the current flowing therethrough, which resistors are traversed by current corresponding to the amplitude value which is to be converted (analog current), and wherein the individual resistors flip at different values of the analog current from a condition of low resistance into a condition of higher resistance, and vice versa, the above noted object is according to the invention achieved by the provision of a plurality of flip resistors corresponding in number to the number of amplitude stages, means for arranging said resistors in at least two series circuits disposed in mutually parallel relationship, difference amplifiers or the like, in number corresponding at least to the required place number of the code, the respective difference amplifiers being connected with a common output over separate transmission paths or operating with respect to said common output with time delay, and being operative to compare the voltages appearing at the flip resistors of the two series circuits.

The information, insofar as the amplitudes thereof are concerned, is advantageously obtained in the form of impulses and the corresponding amplitude samples are conducted to the circuit arrangement in the form of short impulses.

Means are in accordance with another advantageous procedure provided for securing the restoration of the entire circuit arrangement into the initial condition, for example, with the aid of opposing voltages or opposing currents.

The time interval between these individual short amplitude samples is advantageously selected so that the circuit arrangement can flip into its initial condition during the ensuing pauses. It may be advisable in given cases to utilize for the transmission only a partial range, for example, 10 percent to 90 percent of the entire comprehensible amplitude range, and to use the remaining lower partial range (0–10 percent) for the restoration of the series circuits.

Tunnel diodes are used as flip resistors in the embodiment of the invention which will now be described with reference to the accompanying drawings. It is moreover assumed that the message which is to be coded is offered to the modulator in the form of an impressed current.

In the drawings,

FIG. 1 shows the characteristic curve of a tunnel diode;

FIG. 2 indicates graphically the connection between the analog value and a binary code constructed according to digital calculation rules, for the assumed example of sixteen amplitude stages;

Figure 1:
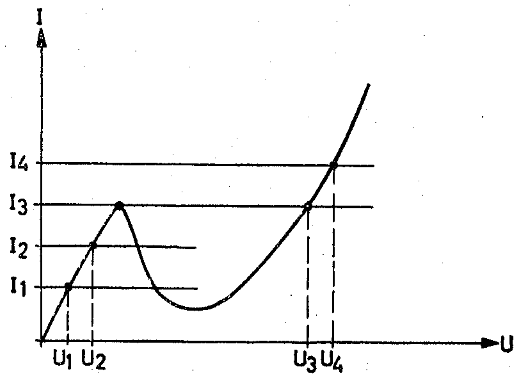

Referring now to the characteristic curve of a tunnel diode as shown in FIG. 1, when a relatively weak current $I_1$ is impressed on the diode, there will result the relatively low voltage $U_1$. An increase in the current results in negligible increase of the voltage ($I_2$, $U_2$). Only when the impressed current reaches the magnitude of the so-called maximum current of the tunnel diode, will the voltage "leap" to a higher value, which happens here at $I_3$, $U_3$. A further current increase results again in negligible voltage change as indicated at $I_4$, $U_4$.

Assuming now a plurality of serially connected tunnel diodes, the same impressed current will flow through all such diodes owing to the serial relationship. Since all the diodes do not respond to the identical maximum current, they will "leap" at different values of the impressed current. The diode which responds to the lowest maximum current will "leap" first to the higher voltage, etc.

It is now possible to obtain a voltage leap respectively at definite predetermined values of the input current. The series circuit could for this purpose be constructed, for example, of diodes selected according to the maximum current thereof, whereby the maximum currents would have to correspond to the respective values of the impressed currents at which the voltage leaps are desired. Another possibility resides in utilizing tunnel diodes with any random maximum current and to supply thereto with the aid of an auxiliary circuit bias currents of suitable polarity. The respective diodes will in the latter case "leap" at the impressed current which is equal to the sum of bias current and maximum current.

The pulse code modulator according to the illustrated embodiment comprises two such diode series. The impressed current corresponds to the message which is to be coded. The produced code is obtained at two or more diodes as the difference between the occurring voltages ("leaps"). The scheme according to which the diodes are assembled and at which impressed currents ($\leq$ amplitude values to be coded) the "leap" will now be explained with reference to FIGS. 2 and 3.

Figure 2:
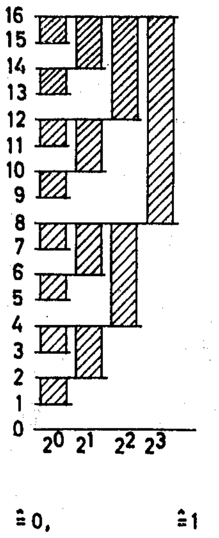
Figure 3:
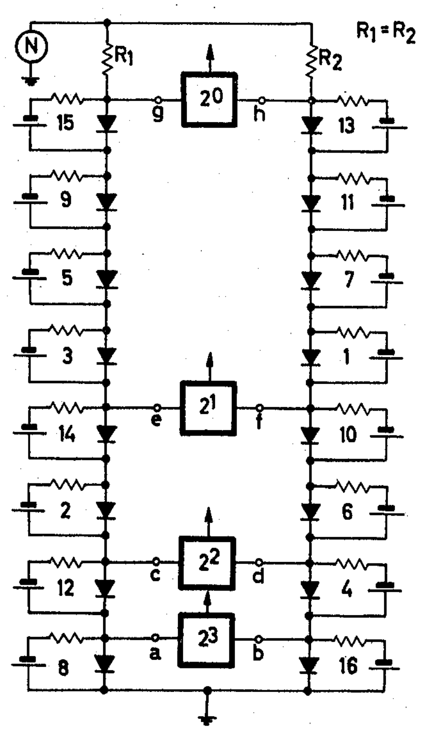
FIG. 3 represents the pulse code modulator.

FIG. 2 shows graphically the relation between the analog value and a binary code, for the example, of sixteen amplitude stages which is here assumed, such binary code being constructed according to digital rules of calculation. FIG. 3 shows the pulse code modulator. Letter N in FIG. 3 indicates the message generator the signals of which are in the form of impressed current conducted to the two rows or series of tunnel diodes over the two resistors $R_1$ and $R_2$.

The circuits at the right and left of the diodes, comprising respectively a battery and a resistor, are intended to indicate symbolically that bias currents are supplied to the diodes. The numerals appearing within these bias circuits indicate the amplitude values of the impressed current at which the respective diodes "leap." Accordingly, the bias current in the respective circuits is equal to the difference of the corresponding number and the maximum current of the respective tunnel diode.

The production of the code element $2^3$ (FIG. 2) of greatest value will first be considered. This code element is obtained between the terminals *a* and *b* as the difference of the leap voltages of the two tunnel diodes shown at the bottom of FIG. 3. In the event that the voltage at *a*, *b* is zero, the code element will likewise be "0"; if it is greater than zero—that is, if it has the value of a voltage leap—the value of the code element will be "1."

At impressed currents which are smaller than 8, only a very low voltage will appear at the diodes 8 and 16, for example, the voltage $U_1$ indicated in FIG. 1. Since nearly the same low voltage lies on the two diodes, no voltage difference will appear at the terminals *a*, *b*. Only when the message current reaches the value 8 will the left diode "leap"; its leap voltage lies at *a*, *b*, and the code "1" is given off. As is apparent from FIG. 2, the code element $2^3$ must be "switched in" at 8 and "switched out" again at 16. At a message current with the amplitude value 16, the second diode 16 will also "leap" and, as required, will again disconnect the code element $2^3$, since the difference from two leap voltages, that is, the voltage zero will lie on *a*, *b*.

As is apparent from FIG. 2, the next code element must be switched in at the amplitude value 4, to be disconnected at 8 and again switched in at 12 and disconnected at 16. This code element $2^2$ is obtained at the terminals *c* and *d*. The switching in at 4 is effected by the tunnel diode 4 at the right hand diode series and the disconnection is effected at 8 by the previously affected left hand diode 8. The next switching in is effected at 12 by the diode 12 of the left hand row or series and the disconnection is again effected by the previously affected diode 16. Since the switching-in and switching-out are effected in part from the right and in part from the left diode series, the output voltage at *c*, *d* will be at times positive and at times negative. The difference amplifiers which will be presently explained therefore must be constructed so that the change of polarity of the control pulses remains without effect on the output pulse.

The code element $2^1$ which appears between the terminals *e* and *f*, is produced in similar manner. The switching-in at the amplitude values 2, 6, 10 and 14 is respectively effected always by a previously unaffected diode while the switching-out is accomplished by a previously affected diode. The switching-in diode must be included in the series which is disposed opposite to the series which contains the disconnection or switching-out diode.

The operations explained above also apply in the case of the last place of the binary code $2^0$. Diodes become effective which "leap" at the amplitude values 1, 3, 5, 7, 9, 11, 13 and 15.

Since only one diode leaps at the transition from one to the next amplitude value, which diode carries out all required code changes, it is without incurring errors possible to directly obtain the binary code assumed in the example of the disclosed embodiment, without having to obtain first the Stibitz-Gray code.

Owing to the great constancy of the current maxima in tunnel diodes, very low impressed currents can be used, for example, a current amounting to less than 1 ma. suffices per amplitude stage.

Only ohmic resistors and fast tunnel diodes are being used and the coding speed therefore depends mainly upon the upper limit frequency of the diodes. For example, the coding of a basic band of 5 megacycles should be possible with the aid of tunnel diodes with 2 gigacycles limit frequency.

Assuming, for example, that the message source N, FIG. 3, supplies pulse amplitude modulation, the binary code may be obtained in parallel between the terminals *a* to *h*.

Instead of the binary code assumed in the described embodiment, there may be obtained binary codes constructed according to different rules and/or other amplitude stage number.

A modulator with 16 tunnel diodes has been constructed in a practical embodiment for 16 amplitude stages. A current of 200 microamperes was impressed per amplitude stage. The entire arrangement accordingly required only $0.2 \times 16 \times 2 = 6.5$ milliamperes. The maximum voltage obtained amounted to 4 volts.

Figure 4:
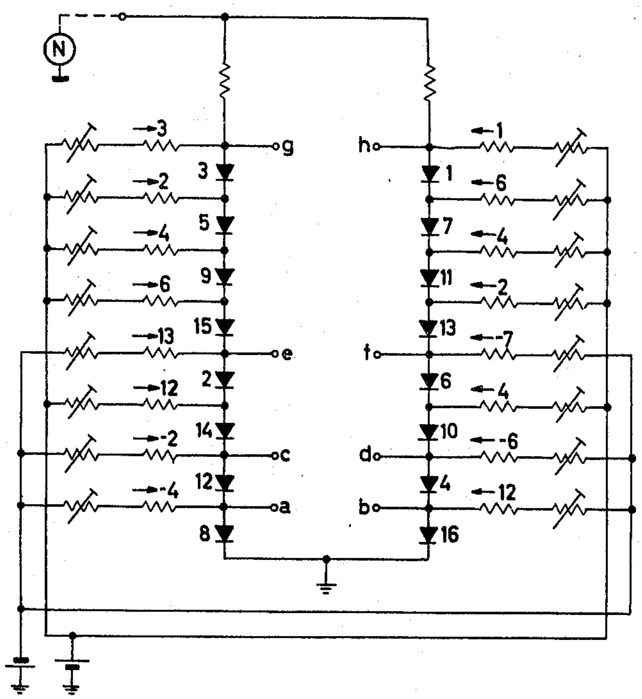
FIG. 4 shows the manner of supplying the bias currents.

FIG. 4 shows the manner in which the bias currents were supplied. The diode sequence within the individual binary stages was thereby changed, for example, to obtain within the individual binary stages a continuous staggering of the amplitude values referred to the individual diodes. Only the uppermost two diodes 3 and 1 receive the original bias current which is so selected that they "leap" respectively at 3 and 1. This bias current flows through all other diodes. The individual diode bias currents are with respect to the two oppositely poled current sources adjusted, in part as summation currents and in part as difference currents, by means of adjustable bias resistors cooperatively connected with fixed resistors, so as to provide for a finer adjustment of the respective compensation range.

The high resistance input circuit and the likewise high resistance bias current circuits are mutually completely uncoupled by the low internal resistance of the tunnel diodes. This is also the case in connection with the previous proposal.

It is for the further processing suitable to convert the code signals, which are at times positive and at times negative, into signals of identical polarity and to make them at the same time available as voltage with respect to ground. For this purpose, four difference amplifiers are, for example, used for the four binary places.

Figure 5:
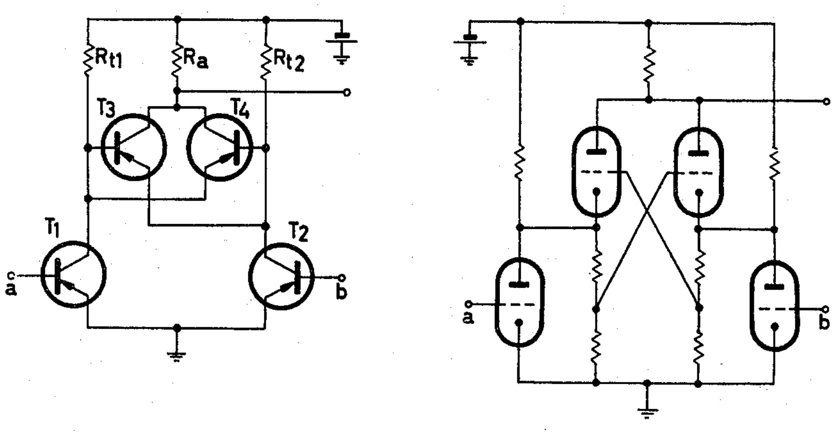
FIG. 5 illustrates examples of circuits for the difference amplifiers employing respectively transistors and tubes.

FIG. 5 shows circuits suitable for these amplifiers, employing respectively transistors and tubes to give examples. In the absence of input voltages, the transistors $T_1$ and $T_2$ have preferably a slight normal current. Upon connecting at one of the terminals *a, b,* a voltage impulse with respect to the reference potential, different voltages will appear $R_{t1}$ and $R_{t2}$, which produce over the transistors $T_3$ and $T_4$ a corresponding output impulse at $Ra$. The polarity and amplitude of the input impulse at *a* or *b*, with respect to the reference potential is in view of the normal current immaterial. Likewise, owing to the symmetry of the circuit part which contains the transistors $T_1$ and $T_2$, no output impulse is produced when the input voltages at *a* and *b* are identical.

The circuit equipped with tubes operates in analogous manner.

It has been assumed that 16 amplitude stages are provided in the illustrated embodiment. The low number of flip resistors which are in such case required can be arranged in two parallel rows without incurring any considerable capacitive disturbances. However, when a greater number of flip resistors are required, they should be arranged in more than two parallel rows. For example, 256 amplitude stages may be distributed in four parallel double rows each with 64 amplitude stages. The first double row is in such case assigned to the amplitude stages 1–64, the second double row to the amplitude stages 65–128, etc.

The modulator according to FIG. 4 is restored to normal in the pauses between the impulses by a restoring pulse which is negative with respect to the reference potential, such impulse being conducted to the modulator input in the pauses between the impulses extended thereto from the message source. For example, in the case of an amplitude modulated impulse sequence fed to the modulator, it is possible by the selection of the direct current value for this impulse sequence (for example, by the selection of the triggering range), to use the impulse portion lying between the operatively effective impulses, with a polarity opposite to that of the noted direct current value, so as to serve as a restoring pulse.

Changes may be made within the scope and spirit of the appended claims which define what is believed to be new and desired to have protected by Letters Patent.

I claim:

1. A circuit arrangement for converting amplitude values (analog values) of a message into an impulse sequence corresponding to a binary permutation code, with the aid of a series circuit including resistors which exhibit flip properties and the resistance values of which depend upon the current flowing therethrough, said resistors being traversed by an analog current corresponding to the amplitude value which is to be converted, whereby the individual flip resistors flip at different values of the analog current from a condition of low resistance to a condition of higher resistance and vice versa, comprising a plurality of flip resistors corresponding in number to the desired number of amplitude stages, means for arranging said flip resistors in at least two mutually parallel extending series circuits a plurality of difference amplifiers corresponding in number at least to the number of places of the code for comparing the voltages occurring at the flip resistors of two rows, and at the outputs of which appears the impulse sequence corresponding to a binary permutation code.

2. A circuit arrangement according to claim 1, wherein said difference amplifiers operate with relative time delay.

3. A circuit arrangement according to claim 1, comprising means for supplying the amplitude values of the information in the form of impulses, and means for conducting to the circuit arrangement corresponding amplitude samples in the form of short impulses.

4. A circuit arrangement according to claim 1, comprising means for restoring the entire circuit arrangement to normal condition with the aid of opposing electrical conditons.

5. A circuit arrangement according to claim 1, comprising means for restoring the entire circuit arrangement to normal condition with the aid of opposing voltages.

6. A circuit arrangement according to claim 1, comprising means for restoring the entire circuit arrangement to normal condition with the aid of opposing currents.

7. A circuit arrangement according to claim 3, wherein the time interval between the individual amplitude samples is so selected that the circuit arrangement can flip into the initial condition during the ensuing pauses.

8. A circuit arrangement according to claim 4, wherein only a partial range of the entire comprehensible amplitude range is utilized for the transmission while the remaining lower partial range serves for restoring the series circuit to normal condition.

9. A circuit arrangement according to claim 4, wherein only a partial range amounting to 10 to 90 percent of the entire comprehensible amplitude range is utilized for the transmission while the remaining lower partial range amounting to 0–10 percent serves for restoring the series circuit to normal condition.

(References on following page)

References Cited by the Examiner

UNITED STATES PATENTS

| | | | |
|---|---|---|---|
| 2,805,408 | 9/1957 | Hamilton | 340—174 |
| 3,041,469 | 6/1962 | Ross | 307—88.5 |
| 3,050,721 | 8/1962 | Anderson | 340—347 |

OTHER REFERENCES

J. Lettierei: Analog to Digital Converter, IBM Technical Disclosure Bulletin, vol. 3, No. 9, February 28, 1961.

MALCOLM A. MORRISON, *Primary Examiner.*

DARYL W. COOK, *Examiner.*